United States Patent [19]
Orii

[11] Patent Number: 5,394,074
[45] Date of Patent: Feb. 28, 1995

[54] CONTINUOUS CELL CHARGER

[75] Inventor: Katsumi Orii, Machida, Japan

[73] Assignee: Temtech Kabushikigaisha, Tokyo, Japan

[21] Appl. No.: 199,497

[22] Filed: Feb. 22, 1994

[30] Foreign Application Priority Data

Mar. 8, 1993 [JP] Japan .................................. 5-070792
Sep. 28, 1993 [JP] Japan .................................. 5-263054

[51] Int. Cl.⁶ .......................................... H01M 10/44
[52] U.S. Cl. .......................................... 320/15; 320/2
[58] Field of Search ............................. 320/2, 5, 6, 15

[56] References Cited

U.S. PATENT DOCUMENTS

| | | | |
|---|---|---|---|
| 3,675,108 | 7/1972 | Nicholl | 320/2 |
| 3,696,283 | 10/1972 | Ackley, III | 320/2 |
| 4,237,409 | 12/1980 | Sugalski | 320/2 |
| 5,206,577 | 4/1993 | Fish | 320/2 |

*Primary Examiner*—Kristine L. Peckman
*Attorney, Agent, or Firm*—Collard & Roe

[57] ABSTRACT

A continuous cell charger including a cell insertion chamber into which discharged cells are inserted. A charging chamber has an inlet side that is in communication with the cell insertion chamber. Several pairs of plus and minus electrodes are arranged in a row within the charging chamber at intervals equal to the diameter of each cell. A charging circuit supplies a charging voltage to the pairs of electrodes. A lever pushes each cell, that has been inserted into the cell insertion chamber, into position between the first pair of electrodes within the charging chamber. The cells already within the chamber are also moved a predetermined distance corresponding to a cell diameter. A charged cell accommodating chamber is in communication with an outlet side of the charging chamber. The charged cell accommodating chamber receives and stores charged cells. To use the continuous cell charge, a discharged cell is placed into the cell charger and the lever is actuated.

6 Claims, 6 Drawing Sheets

FIG.1(A)
FIG.1(B)
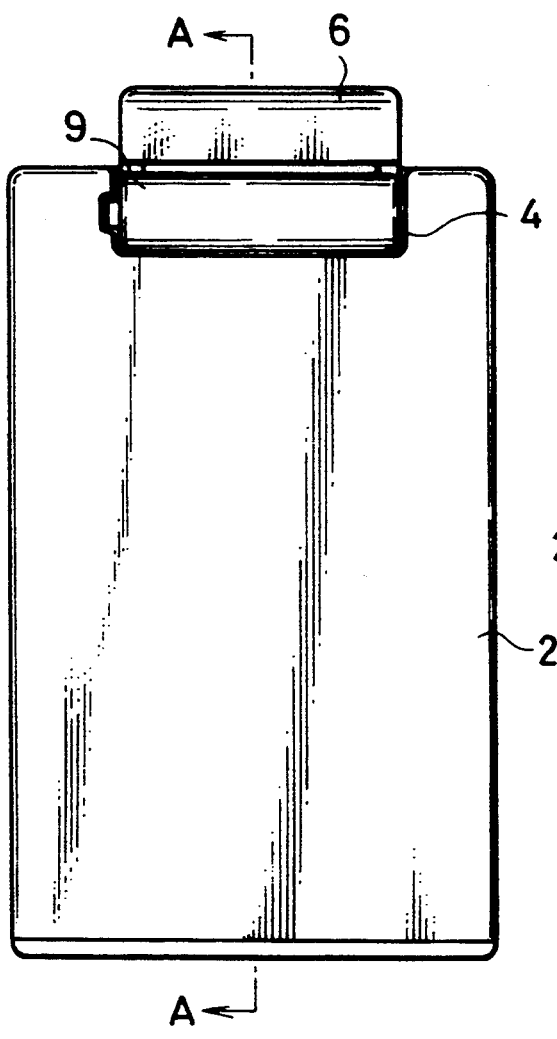
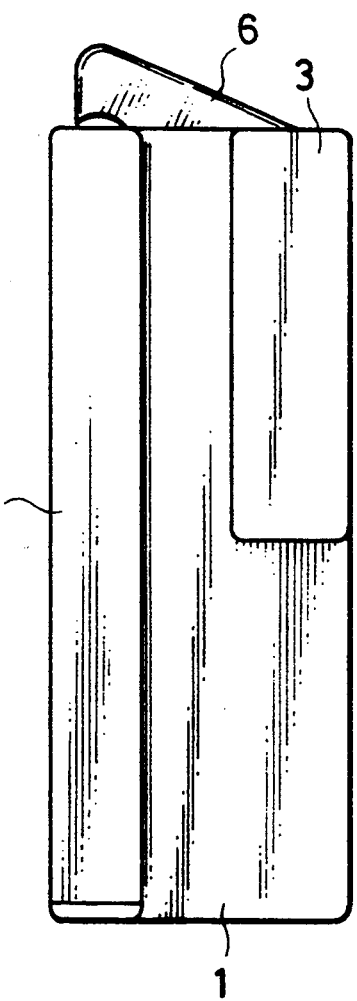

CONTINUOUS CELL CHARGER

BACKGROUND OF THE INVENTION

1. Field of the Invention

The present invention relates to a continuous cell charger for continuously charging a plurality of chargeable dry cells such as chargeable alkaline manganese dioxide cells.

2. Description of the Prior Art

Heretofore, charging of cells have been conducted by inserting a predetermined number of cells into a charger and taking them out after the lapse of a predetermined time. Thus, since it is necessary to use the charger in a conscious manner in point of both quantity and time, how to use the charger has been troublesome.

SUMMARY OF THE INVENTION

It is a first object of the present invention to provide a continuous cell charger which is easy to use and which permits charged cells to be taken out any time.

It is a second object of the present invention to provide a continuous cell charger capable of facilitating the removal of cells after charging.

In one aspect of the present invention there is provided a continuous cell charger including a cell insertion chamber into which discharged cells are inserted from the exterior; a charging chamber whose inlet side is in communication with the cell insertion chamber and which has a space extending in a predetermined direction; plural pairs of plus and minus electrodes, the plus electrodes and the minus electrodes being each arranged in a row in the said predetermined direction within the charging chamber at intervals equal to the diameter of each cell and also functioning to guide the cells movably; a charging circuit for supplying a charging voltage to those electrodes; a lever for pushing a cell which has been inserted into the cell insertion chamber, thereby allowing the cell to move to the position between the first plus and minus electrodes in the charging chamber, and for moving cells already received between the plus and minus electrodes in the charging chamber also in the predetermined direction by a distance corresponding to one cell; and a charged cell accommodating chamber which is in communication with an outlet side of the charging chamber and which receives therein the cells transferred from the charging chamber. According to this construction, all that is required for the user is only insertion of discharged cells and making operation for pushing the lever. Consequently, it is possible to simplify the way of using the charger. Moreover, since the cells after charging are received within the charged cell accommodating chamber, it is possible to take out the charged cells any time.

In another aspect of the present invention there is provided a continuous cell charger combined with the above battery charger and further including a rotary drawer disposed in the charged cell accommodating chamber rotatably between closed and open positions so that in the closed position the rotary drawer is stowed within the charged cell accommodating chamber to receive through an opening portion thereof the cells transferred from the charging chamber, while in the open position the said opening portion is exposed to the exterior to permit removal of the charged cells through the opening portion. Thus, since the opening portion of the rotary drawer is exposed to the exterior upon rotation of the same drawer to the open position, it is possible to facilitate the removal of the charged cells.

BRIEF DESCRIPTION OF THE DRAWINGS

FIG. 1(A) is a front side elevation view of an embodiment of a continuous cell charger, according to the present invention;

FIG. 1(B) is a right side elevational view of the continuous cell charger;

DETAILED DESCRIPTION OF THE PREFERRED EMBODIMENTS

Figure 2:
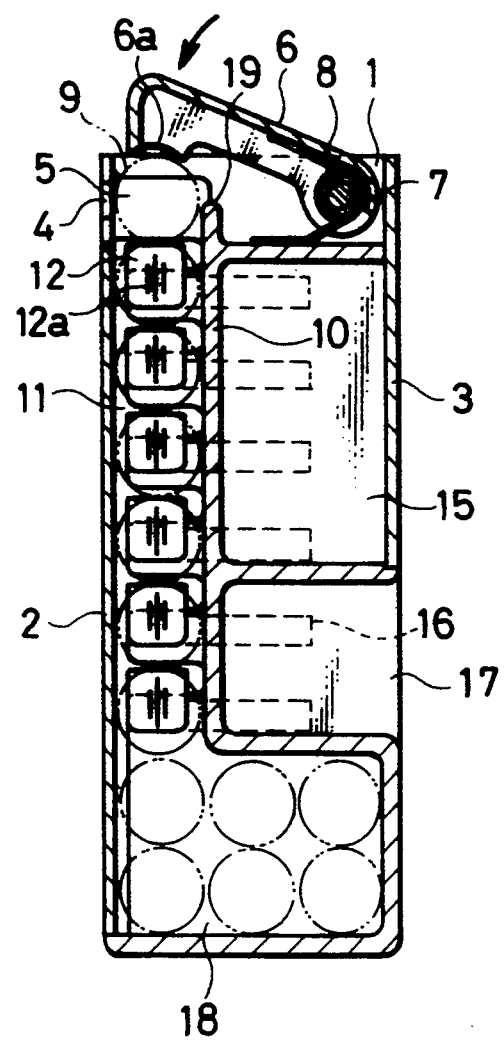
FIG. 2 is a cross-sectional view taken along the line A—A from FIG. 1(A)
Figure 3A:
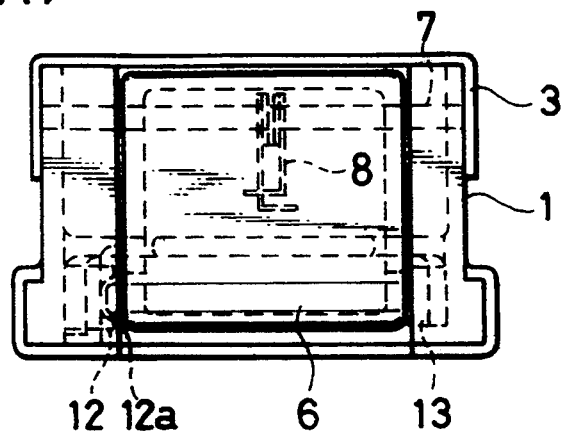
FIG. 3(A) is a top plan view of the continuous cell charger with the front cover removed.
Figure 3B:
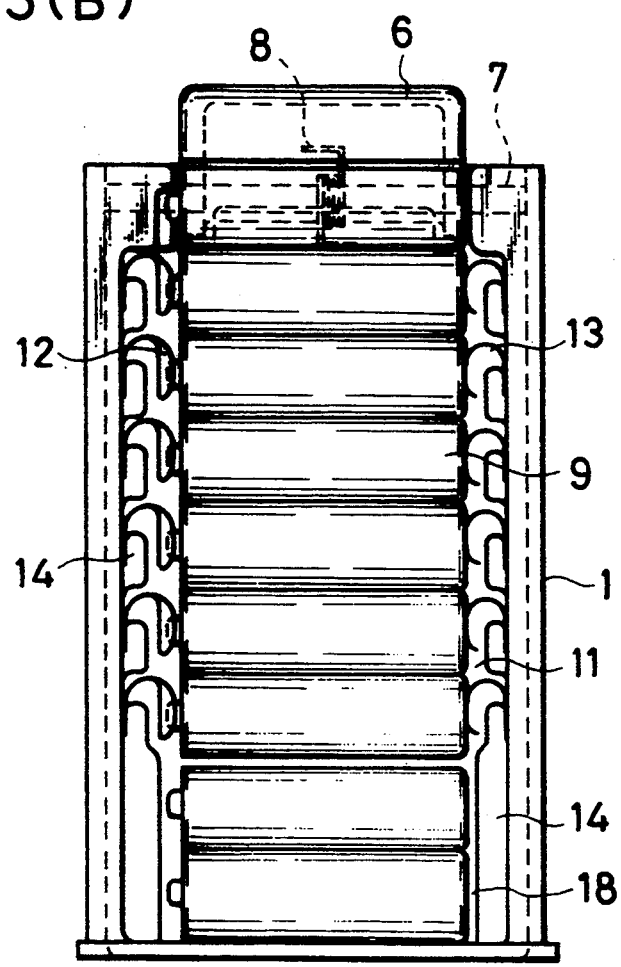
FIG. 3(B) is a front side elevational view with the cover removed.

FIGS. 1(A), 1(B), 2, 3(A) and 3(B) illustrate an embodiment of the present invention, of which FIGS. 1(A) and 1(B) are a front view and a side view of one embodiment of the present invention, FIG. 2 is a sectional view taken on line A—A' of FIG. 1, and FIGS. 3(A) and 3(B) are a front view and a plan view of the embodiment, with a front cover removed.

In FIGS. 1(A) and 1(B), a front cover 2 is mounted to the front of a case body 1 so that it can be pulled up, while to the back of the case body 1 is fixed a rear cover 3. In the upper portion of the front cover 2 is formed a cell insertion opening 4, which is in communication with a cell insertion chamber 5 (FIG. 2) formed in the upper portion of the case body 1. Further, a lever 6 is mounted depressably to the upper portion of the case body.

In FIGS. 2, 3(A) and 3(B), the lever 6 is mounted rotatably on a shaft 7 which is fixed to the case body 1, and it is urged in the clockwise direction in FIG. 2 by means of a coiled spring 8 and is positioned as in FIG. 2 by means of a stopper (not shown). The front end of the lever 6 is formed with a depressing part 6a which comes into abutment with a cell 9 inserted into the cell insertion chamber 5 from the exterior.

Below the cell insertion chamber 5 is formed a charging chamber 11 which is defined by a partition wall 10. The charging chamber 11, whose inlet side (upper side) is in communication with the cell insertion chamber 5, has a space extending vertically downwards. Within the charging chamber 11 are provided plural pairs of plus electrodes 12 and minus electrodes 13 in such a manner that both electrodes are each arranged in a row vertically downwards and at intervals equal to the diameter of each cell 9. The plus and minus electrodes 12, 13 are mounted to the case body 1 through electrode mounting members 14. The plus electrodes 12 are each formed of an electrically conductive plate spring material and centrally provided with a vertical recess 12a as indicated with a dotted line in FIG. 3(a). The plus pole of each cell 9 comes into contact with and slides along the recess 12a, whereby the cell is guided its vertically downward movement. Thus, the electrodes 12 and 13 not only function to charge the cell 9 but also function to guide the cell movably through the recess 12a.

Within the space behind the charging chamber 11 is disposed a charging circuit 15 for supplying a charging voltage to the electrodes 12 and 13. The charging circuit 15 has output terminals, the number of which corresponds to the number of the pairs of the electrodes 12, 13. The output terminals are connected to end portions 16 of the electrodes 12, 13 through lead wires (not shown). The space under the charging circuit 15 serves as plug receptacle portion 17, in which is received a plug (not shown) to be inserted into a plug socket for the supply of electric power to the charging circuit 15.

A charged cell accommodating chamber 18 is formed below the charging chamber 11. The chamber 18, which is in communication with an outlet side (lower side) of the charging chamber 11, receives the cells 9 from the charging chamber.

Description is now directed to the operation of the embodiment illustrated in FIGS. 1 to 3. When the lever 6 is depressed in the direction of arrow in FIG. 2 against the coiled spring 8 after a discharged cell 9 has been inserted into the cell insertion chamber 5 through the cell insertion opening 4, the depressing part 6a of the lever 6 pushes the cell 9 downwards. The lever 6 moves down until abutment with a lever stopper 19 formed integrally with the partition wall 10. This stroke is equal to the diameter of one cell 9. As a result, the discharged cell 9 is moved to the position between the first electrodes 12 and 13, while the cells 9 already located between the electrodes 12 and 13 in the charging chamber 11 are each moved to the position between the next electrodes 12 and 13, so that cell 9 located between the last electrodes 12 and 13 in the charging chamber 11 drops into the charged cell accommodating chamber 18. While the cells 9 thus move successively between the electrodes 12 and 13 in the charging chamber 11, they are charged until drop into the chamber 18.

Thus, all that is required for the user is only insertion of a discharged cell 9 into the cell insertion chamber 5 and subsequent operation of pushing the lever 6. It is not necessary to monitor the subsequent state of charging. Therefore, the battery charger of this embodiment can be used in a simple manner. Moreover, since charged cells 9 are accommodated within the charged cell accommodating chamber 18, they can be taken out any time for use.

Instead of manual operation, the lever 6 may be operated electrically (for example, using an electric motor) by operating a switch. For opening and closing the charged cell accommodating chamber 18, not only pulling-up of the front cover 2 but also various other means may be adopted. Further, although in the above embodiment the cells 9 are moved vertically downwards, it is also possible to move them in the horizontal direction for example.

Figure 4A:
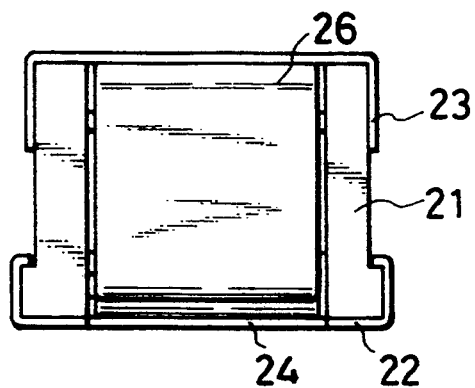
FIG. 4(A) is a top plan view of an alternate embodiment of a continuous cell charger, according to the invention.
Figure 4B:
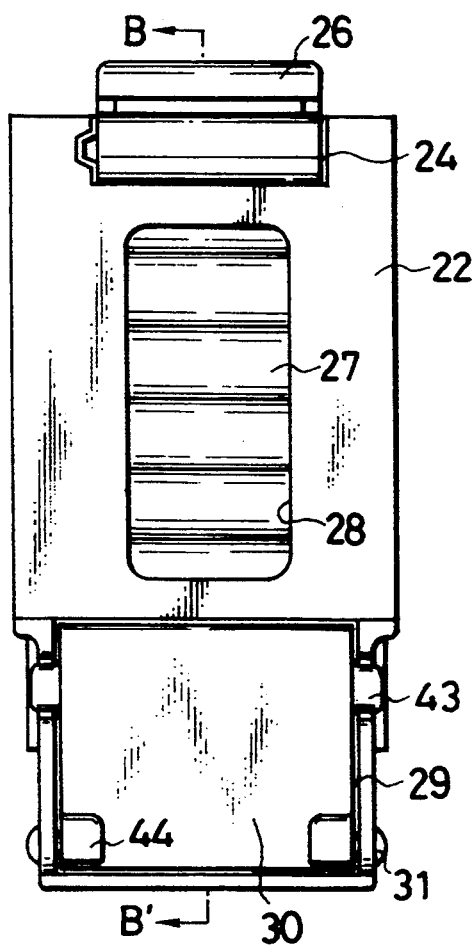
FIG. 4(B) is a front side elevational view of the continuous cell charger.
Figure 4C:
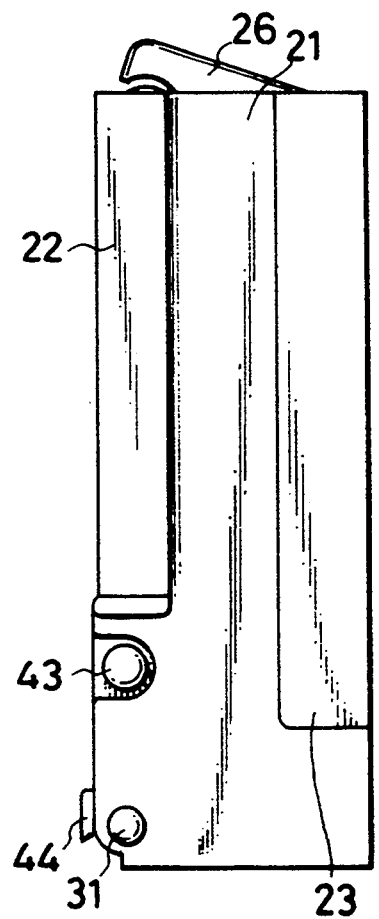
FIG. 4(C) is a right side elevational view of the continuous cell charger.
Figure 5:
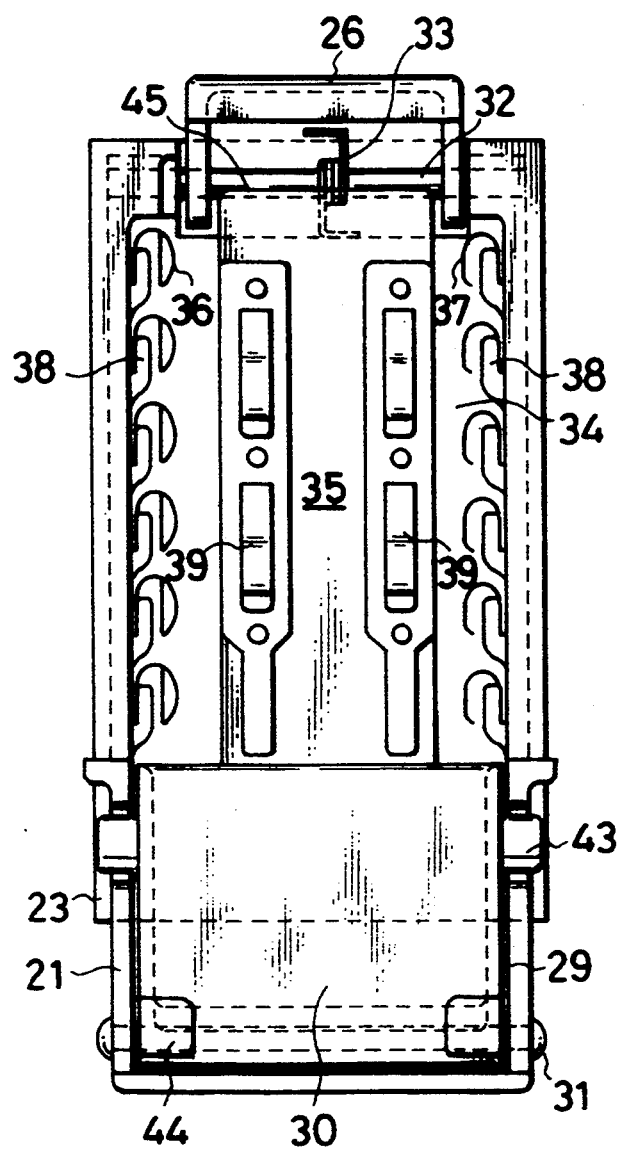
FIG. 5 is a front side elevational view of the continuous cell charger with the front cover removed.
Figure 6:
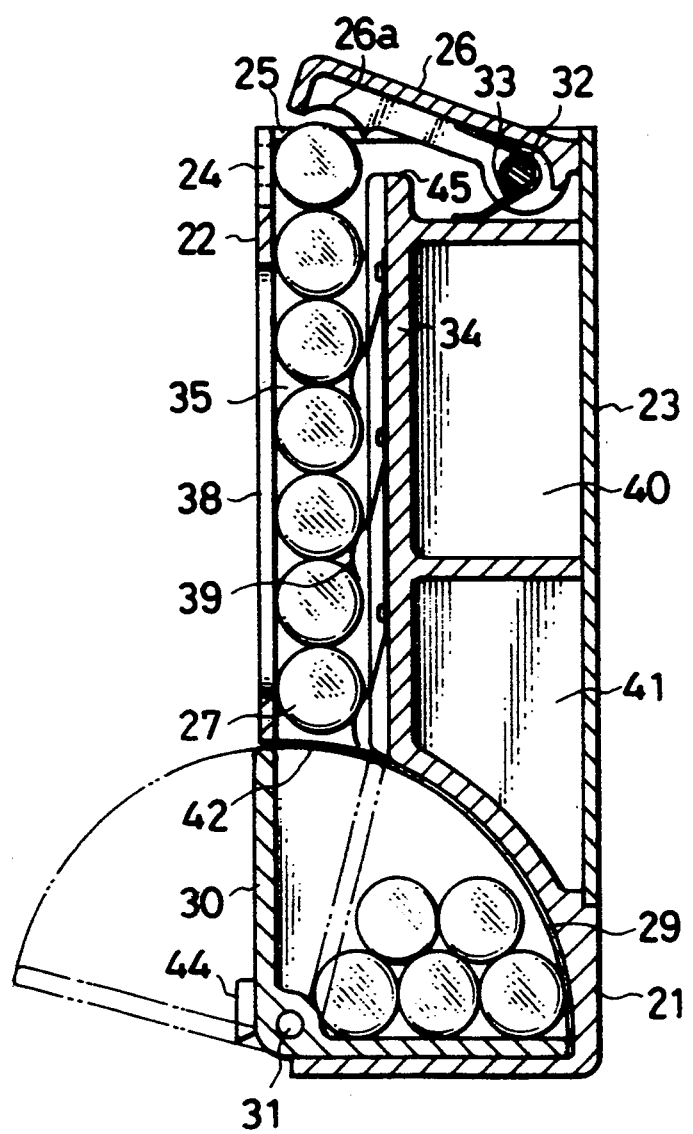
FIG. 6 is a cross-sectional view taken along the line B—B' from FIG. 4(B).

FIGS. 4(A), 4(B), 4(C), 5 and 6 illustrate a continuous cell charger according to another embodiment of the present invention, of which FIGS. 4(A), 4(B) and 4(C) are a plan view, a front view and a side view of the continuous cell charger, FIG. 5 is a front view of the same cell charger, with a front cover thereof removed, and FIG. 6 is a sectional view taken on line B—B' in FIG. 4(b).

In FIGS. 4(A), 4(B) and 4(C), a front cover 22 is mounted to the front of a case body 21 in such a manner as can be pulled upward, while to the back of the case body 21 is fixed a rear cover 23. In the upper portion of the front cover 22 is formed a cell insertion opening 24, which serves as an inlet of a cell insertion chamber 25 (FIG. 6) formed in the upper portion of the case body 21. A lever 26 is attached depressably to the upper portion of the case body 21. Under the cell insertion opening 24 of the front cover 22 is formed a window 28 to make cells 27 in the case body 21 visible.

A charged cell accommodating chamber 29 is formed in the lower portion of the case body 21, and within the chamber 29 is disposed a drawer 30 that is pivotable about a shaft 31 between the closed position, shown in solid line, and the open position, shown in dotted line.

In FIGS. 5 and 6, the lever 26 is mounted rotatably on a shaft 32 which is fixed to the case body 21, and it is urged clockwise in FIG. 6 by means of a coiled spring 33 and stops in its position shown in FIG. 6. The front end of the lever 26 is formed with a depressing part 26a for abutment with a cell 27 which has been inserted into the cell insertion chamber 25 from the exterior.

Formed under the cell insertion chamber 25 is a charging chamber 35 which is defined by a partition wall 34. The charging chamber 35, whose inlet side (upper side) is in communication with the cell insertion chamber 25, has a space extending vertically downwards. Within the charging chamber 35, as shown in FIG. 5, plural pairs of plus electrodes 36 and minus electrodes 37 are provided in such a manner that both electrodes are each arranged in a row vertically downwards and at intervals equal to the diameter of each cell 27. The plus and minus electrodes 36, 37 are mounted to the case body. 21 through electrode mounting members 38. The plus electrodes 36 are each formed of an electrically conductive plate spring material and provided with a vertical recess (not shown). Each cell 27 is guided its vertically downward movement by contact and sliding motion of its plus pole with respect to the said recess. Thus, the electrodes 36 and 37 also have the function of guiding the cell movably through the said recess, in addition to the charging function for the cell 27. In order to stabilize the cell positions, plate springs 39 are mounted in two rows to a central concave portion of the partition wall 34. As shown in FIG. 6, the plate springs 39 push the cells 27 toward the front cover 22 while somewhat pushing up the cells, so that the cell positions are kept stable during charging.

In the space behind the charging chamber 35 is disposed a charging circuit 40 for supplying a charging voltage to the electrodes 36 and 37. The charging circuit 40 has output terminals, whose number corresponds to the number of the pairs of the electrodes 36 and 37 and which are connected to those electrodes through lead wires (not shown). The space formed under the charging circuit 40 serves as a plug receptacle portion 41, in which is accommodated a plug (not shown) to be inserted into a plug socket for the supply of electric power to the charging circuit 40.

The charged cell accommodating chamber 29 formed below the charging chamber 35 is in communication with an outlet side (lower side) of the charging chamber 35. The rotary drawer 30, which is disposed in the charged cell accommodating chamber 29 and mounted on the shaft 31 for rotational movement between closed and open positions, has a fan-shaped sectional shape, and its arcuate edge portions define a large opening 42.

In the closed position, the rotary drawer 30 is accommodated within the charged cell accommodating chamber 29 and receives through the opening 42 each cell 27 dropping from the charging chamber 35, while in the open position, its opening portion 42 is exposed to the dash-double dot line position in FIG. 6 so that the cells 27 accommodated within the rotary drawer can be taken out through the opening portion. Also in the open position, a portion of the rotary drawer 30 is positioned within the charged cell accommodating chamber 29 so as to permit reception of the dropping cell 27. The rotary drawer 30 is stabilized in its closed position or open position by the weight of the cells 27 accommodated therein. The numeral 43 denotes a knob for the rotating operation of the rotary drawer; numeral 44 denotes a stopper which comes into abutment with a bottom end of the case body 21 to define the open position; and numeral 45 denotes a lever stopper.

Reference will now be made to the operation of the embodiment illustrated in FIGS. 4(A) to 6. When the lever 26 is forced down against the coiled spring 33 after a discharged cell 27 has been inserted into the cell insertion chamber 25 through the cell insertion opening 24, the depressing part 26a of the lever 26 pushes the cell 27 downward. The lever 26 moves down until abutment with the lever stopper 45 formed integrally with the partition wall 34. This stroke is equal to the diameter of one cell 27. Consequently, the discharged cell 27 thus inserted is moved to the position between the first electrodes 36 and 37, while the cells 27 already located between the electrodes 36 and 37 in the charging chamber 35 are each moved to the position between the next electrodes 36 and 37, and the cell 27 located between the last electrodes 36 and 37 drops into the rotary drawer 30. Each cell 27 is charged while moving successively between the electrodes 36 and 37 in the charging chamber 35 and is accommodated in the rotary drawer 30 until when it is taken out.

For taking out the cells 27 thus accommodated, the rotary drawer 30 is pulled out to the front side by the user with the aid of the knobs 43, so that the rotary drawer rotates up to the open position indicated by the dash-double dot line in FIG. 6. In the open position, the opening portion 42 is exposed largely to the exterior, thus permitting the cells 27 to be taken out easily.

As described above, all that is required for the user is merely inserting a discharged cell into the cell insertion chamber 25 and pushing the lever 26, there being no need of monitoring the subsequent charging state. Therefore, the cell charger of this embodiment can also be used in a simple manner. Moreover, since charged cells 27 are accommodated within the rotary drawer 30 in the charged cell accommodating chamber 29, they can be taken out any time for use. Further, since the charged cells 27 are taken out by rotating the rotary drawer 30 to the front side, it is easy to effect this taking-out operation.

The lever 26 may be operated electrically (for example, using an electric motor) by operating a switch, instead of manual operation. Further, although in the embodiment illustrated in FIGS. 4(A) to 6 the cells 27 are moved vertically downwards, they may be moved in the horizontal direction for example.

What is claimed is:

1. A continuous cell charger including:
  a cell insertion chamber into which discharged cells are inserted from the exterior;
  a charging chamber whose inlet side is in communication with said cell insertion chamber and which has a space extending in a predetermined direction;
  plural pairs of plus and minus electrodes, said plus electrodes and said minus electrodes being each arranged in a row in said predetermined direction within said charging chamber at intervals equal to the diameter of each of said cells and also functioning to guide the cells movably;
  a charging circuit for supplying a charging voltage to said electrodes;
  a lever for pushing one of said cells which has been inserted into said cell insertion chamber, thereby allowing the cell to move to a position between a first pair of plus and minus electrodes in said charging chamber, and for moving cells already received between the plus and minus electrodes in the charging chamber also in said predetermined direction by a distance corresponding to one cell; and
  a charged cell accommodating chamber which is in communication with an outlet side of said charging chamber and which receives therein the cells transferred from the charging chamber.

2. A continuous cell charger according to claim 1, wherein said space of said charging chamber extends in the vertical direction.

3. A continuous cell charger according to claim 2, wherein said lever has a depressing part formed at the front end thereof for depressing the cell in said cell insertion chamber when the lever is actuated with an operating force.

4. A continuous cell charger according to claim 1, further including a rotary drawer disposed in said charged cell accommodating chamber rotatably between a closed position and an open position so that in the closed position the rotary drawer is stowed within the charged cell accommodating chamber to receive through an opening portion thereof the cells transferred from said charging chamber, while in the open position said opening portion is exposed to the exterior to permit a charged cell to be taken out through the opening portion.

5. A continuous cell charger according to claim 4, wherein said rotary drawer has a knob for effecting its rotating motion.

6. A continuous cell charger according to claim 2, wherein plate springs are disposed in said charging chamber for ensuring a positional stabilization of the cells during charging.

* * * * *